United States Patent [19]

Le Polozec et al.

[11] Patent Number: 5,138,272
[45] Date of Patent: Aug. 11, 1992

[54] MICROWAVE DEMODULATOR FOR DIGITAL RADIO LINKS USING QAM TYPE MODULATION

[75] Inventors: Xavier Le Polozec, Paris; Jean-Christophe Guillard, Bougival; Didier Fayol, Garches, all of France

[73] Assignee: Alcatel Telspace, Nanterre Cedex, France

[21] Appl. No.: 750,383

[22] Filed: Aug. 27, 1991

[30] Foreign Application Priority Data

Aug. 27, 1990 [FR] France ............................ 90 10671

[51] Int. Cl.⁵ .......................... H03D 3/00; H03D 3/28
[52] U.S. Cl. .................................. 329/304; 329/308; 375/81; 375/86
[58] Field of Search ................... 329/304, 308; 375/39, 375/80, 81, 83, 86, 102

[56] References Cited

U.S. PATENT DOCUMENTS 4,546,322 10/1985 Crutcher ........................ 375/83 X

FOREIGN PATENT DOCUMENTS 0305264 of 1989 European Pat. Off. .

OTHER PUBLICATIONS

Hewlett-Packard Journal, vol. 38, No. 11, Dec. 1987, Palo Alto, USA, pp. 25-29, Gildea & Chambers "Vector Modulation in a Signal Generator".

Primary Examiner—David Mis
Attorney, Agent, or Firm—Sughrue, Mion, Zinn, Macpeak & Seas

[57] ABSTRACT

A microwave demodulator for a digital radio link using QAM type modulation, comprising on one path, a first circuit for compensating quadrature error and, on the other path, a second circuit for compensating the delay and temperature variations of the first circuit. The invention is particularly applicable to digital radio beams.

5 Claims, 3 Drawing Sheets

MICROWAVE DEMODULATOR FOR DIGITAL RADIO LINKS USING QAM TYPE MODULATION

The invention relates to a microwave demodulator for digital radio links using QAM type modulation.

BACKGROUND OF THE INVENTION

Data transmission using digital modulation is becoming more and more widely used in radio beams. The digital radio beams that have been developed so far have had a heterodyne structure like analog radio beams. However, technological development now makes it possible to design modulators and demodulators that operate directly at microwave frequencies. This makes it possible to implement low cost transmission systems.

An article by J. P. Bonin entitled (in translation) "Microwave demodulation" published in "L'Onde Electrique", January 1986 (Vol. 66, No. 1), describes the general structure of a microwave demodulator for digital radio links using quadrature amplitude modulation (QAM). The article concludes by stating that increasing digital data rate (n×34 Mbit/s, 140 Mbit/s) requires 16-QAM to be adopted. The demodulator proper can be developed very quickly. However, in the absence of appropriate additional equipment, it is very vulnerable to difficulties associated with propagation. It needs to be associated within the highest-performance devices for matching a transmission channel, in particular by recombination space diversity and by time equalization.

The use of QAM which is of ever-increasing complexity and which has a high degree of spectrum efficiency, makes radio beams more sensitive to manufacturing dispersion in the characteristics of each component assembly or subassembly. In particular, the error rate on a radio link is increased by demodulator quadrature error and by variation thereof as a function of temperature.

An object of the invention is to mitigate this drawback.

SUMMARY OF THE INVENTION

To this end, the present invention provides a microwave demodulator for a digital radio link using QAM type modulation, wherein the demodulator comprises on one path a first circuit for compensating quadrature error and, on the other path a second circuit for compensating the delay and temperature variations of the first circuit.

BRIEF DESCRIPTION OF THE DRAWINGS

An embodiment of the invention is described by way of example with reference to the accompanying drawings, in which.

DETAILED DESCRIPTION

Figure 1:
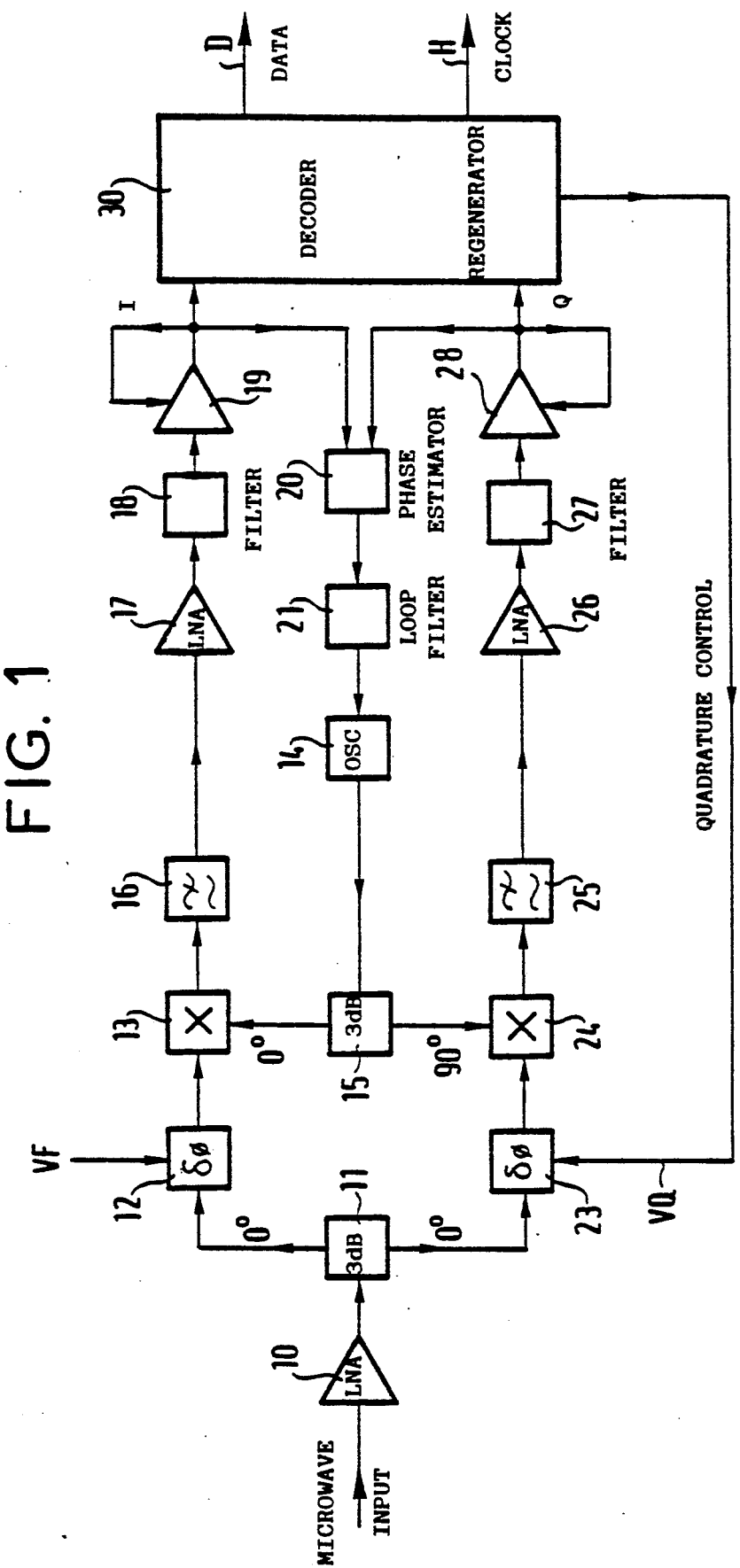
FIG. 1 is a block diagram of a modulator of the invention.

As shown in FIG. 1, a demodulator of the invention comprises:

a low noise amplifier 10 which receives the microwave signal from the antenna bearing a useful signal to be demodulated;

a 3 dB coupler 11 which splits this signal into two in-phase signals on two paths; and on the first path:
a first phase shifter 12;
a first mixer 13 supplied with a signal from a local oscillator 14 via a 0°-90° 3 dB coupler 15, said microwave oscillator being voltage controlled and having its phase servo-controlled by COSTAS loop type digital processing performed by a phase estimator 20 followed by a loop filter 21;
a lowpass filter 16;
a low noise preamplifier 17;
a filter 18; and
an automatic gain control (AGC) amplifier 19 whose output I is connected to the phase estimator 20; and on the second path:
a second phase shifter 23;
a second mixer 24 fed by the same signal as the first mixer, but phase shifted by 90°;
a lowpass filter 25;
a low noise preamplifier 26;
a filter 27;
an AGC amplifier 28 whose output Q is connected to the phase estimator 20; and
a decoder regenerator 30 delivering the demodulating signal D and the clock signal H, and receiving the outputs I and Q from the two AGC amplifiers 19 and 28.

The second phase shifter 23 is used to adjust the quadrature positioning of the components of the signal to be demodulated. It is electrically controlled by a signal from the decoder-regenerator 30. The first phase shifter 12 is a device for compensating delay and temperature variation due to the second phase shifter 23. The first phase shifter 12 is identical in all respects to the second phase shifter 23. It therefore serves to impart identical delay, attenuation, and temperature variation of characteristics on both paths. The electrical control to the first phase shifter 12 remains fixed (fixed voltage VF) at a value that lies in about the middle of the voltage control range (VQ) of the second phase shifter 23.

The lowpass filters 16 and 25 are designed to eliminate unwarranted frequencies.

Figure 2:
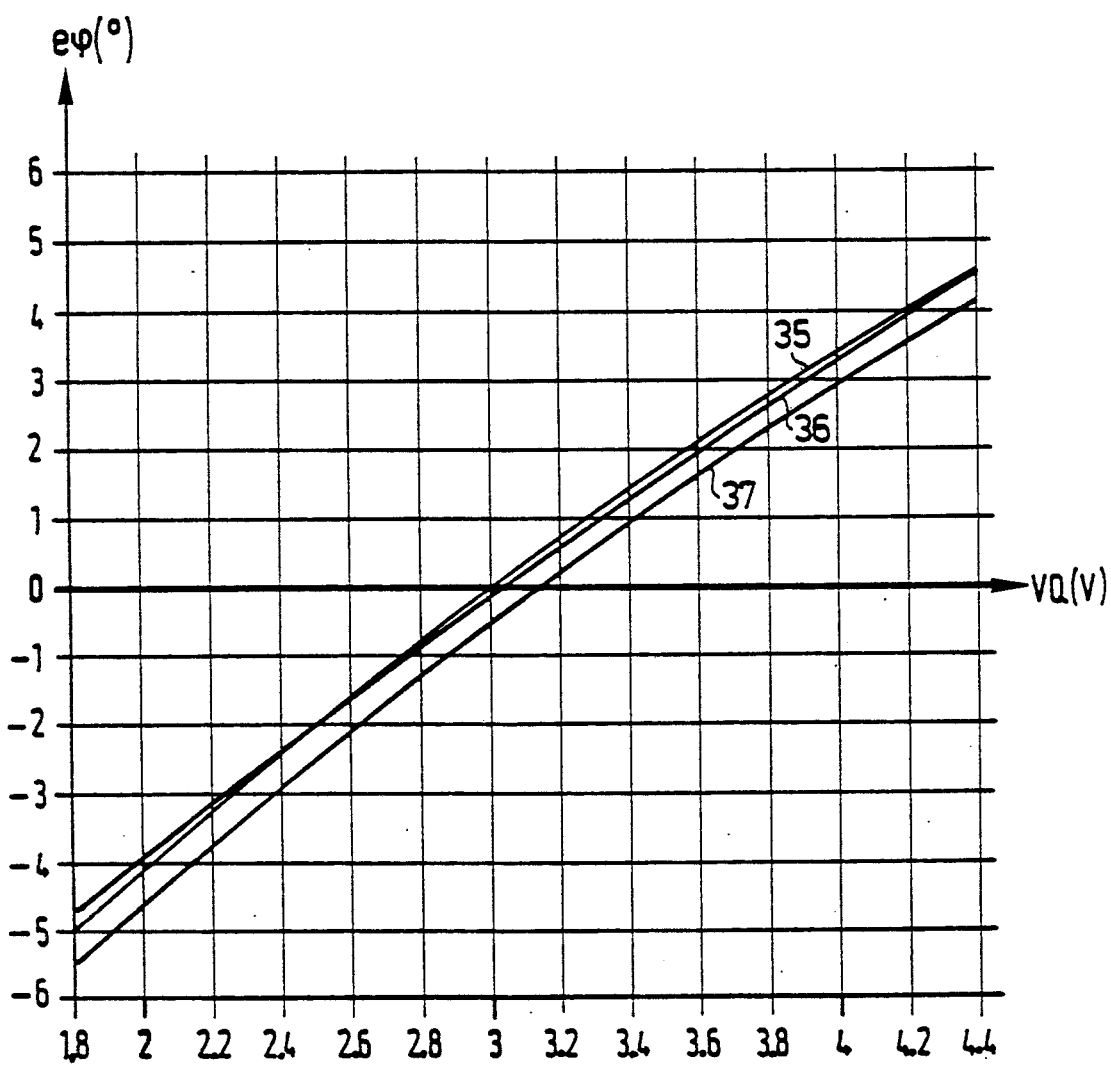
FIGS. 2 and 3 are graphs showing the operation of the demodulator.

Curves 35, 36 and 37 in FIG. 2 show how the phase quadrature error e$\phi$ (in degrees) varies as a function of the control voltage VQ (in volts) at various different carrier frequencies, as follows:
curve 35: 6.4 GHz;
curve 36: 6.75 Ghz;
curve 37: 7.1 GHz.

Figure 3:
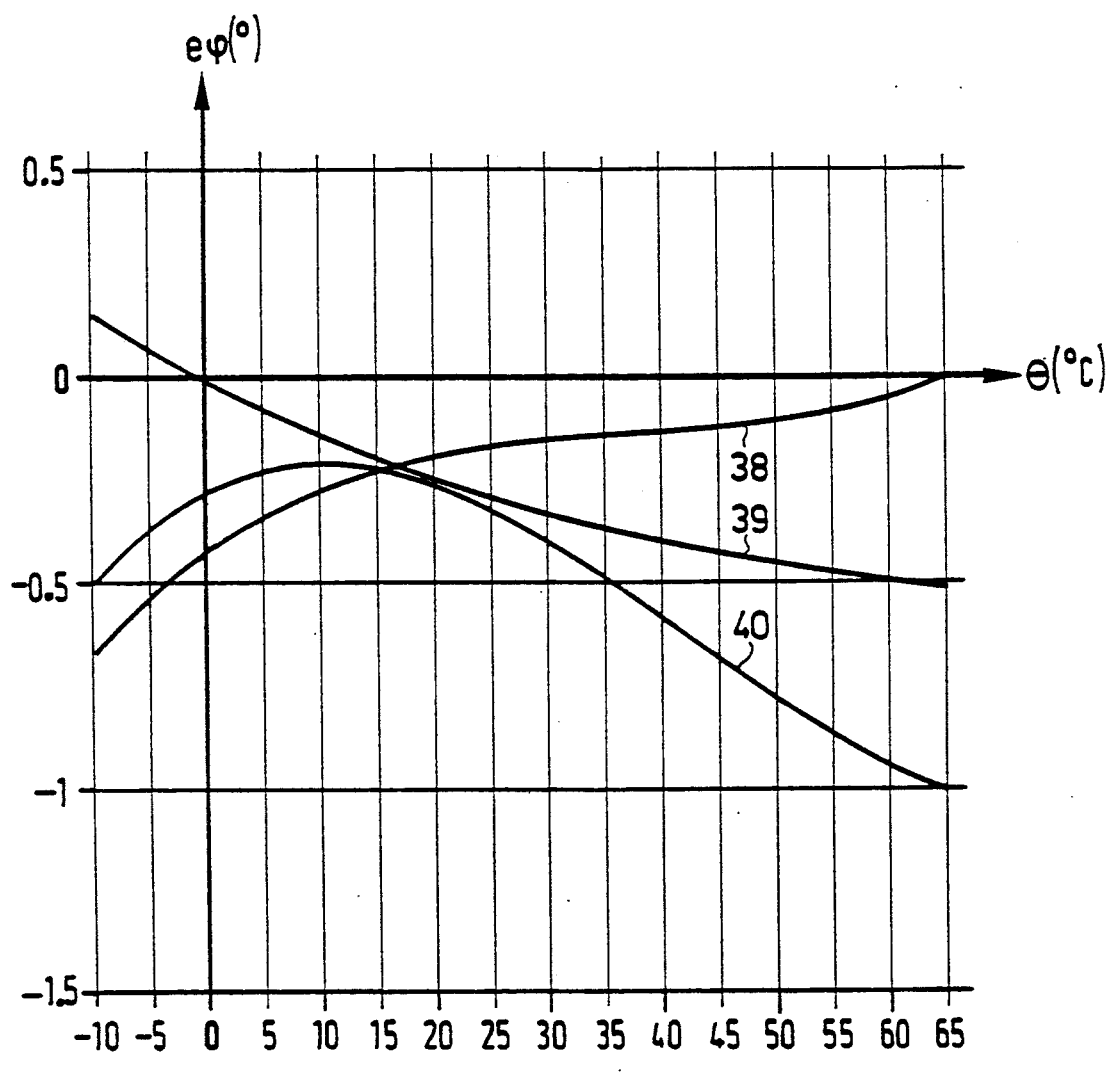

The curves 38, 39, and 40 shown in FIG. 3 show the variation of the phase quadrature error e$\phi$ (in degrees) as a function of temperature $\theta$ (in degrees C.) at various frequencies, as follows:
curve 38: 6.4 GHz;
curve 39: 6.75 GHz;
curve 40: 7.1 GHz.

The demodulator may be implemented using microstrip technology. Each of the phase shifters 12 and 23 may be constituted by 3 dB hybrid coupler 15 loaded at its coupled ports by varactor diodes; the 3 dB coupler 11 may be a Wilkinson coupler.

One such modulator has been made with the following characteristics:
frequency range: 6.4 GHz to 7.1 GHz
insertion losses: <8 dB
noise factor: <8 dB
quadrature without tuning< ±3° error at 180°: <±1°

SWR: <1.2 phase quadrature error: <0.5° over the entire frequency range for temperature varying over the range −10° C. to +65° C.

Naturally the present invention has been described and shown merely by way of preferred example, and its component parts could be replaced by equivalent parts without thereby going beyond the scope of the invention.

We claim:

1. A microwave demodulator for a digital radio link using QAM type modulation, wherein the demodulator comprises, on one path, a first circuit for compensating quadrature error and, on the other path, a second circuit for compensating the delay and temperature variations of the first circuit.

2. A demodulator according to claim 1, wherein each of its two paths includes a respective identical phase shifter.

3. A demodulator according to claim 2, wherein the second circuit is a phase shifter controlled by a fixed voltage.

4. A demodulator according to claim 3, including a decoder-regenerator connected to receive both the first and the second paths, and wherein the first circuit is a phase shifter under electrical control of a signal from the decoder-regenerator.

5. A demodulator according to claim 4, wherein the fixed voltage has a value that is substantially in the middle of the range of variation of the control signal for the first circuit.

* * * * *